United States Patent
Ellenberger

(10) Patent No.: US 7,709,422 B2
(45) Date of Patent: May 4, 2010

(54) METHOD AND COMPOSITION FOR INJECTION AT A TUNNEL BORING MACHINE

(75) Inventor: Peter Ellenberger, Meilen (CH)

(73) Assignee: Construction Research & Technology GmbH, Trostberg (DE)

( * ) Notice: Subject to any disclaimer, the term of this patent is extended or adjusted under 35 U.S.C. 154(b) by 958 days.

(21) Appl. No.: 10/546,551

(22) PCT Filed: Feb. 10, 2004

(86) PCT No.: PCT/EP2004/001229

§ 371 (c)(1),
(2), (4) Date: Jul. 19, 2006

(87) PCT Pub. No.: WO2004/076817

PCT Pub. Date: Sep. 10, 2004

(65) Prior Publication Data

US 2007/0015667 A1    Jan. 18, 2007

(30) Foreign Application Priority Data

Feb. 28, 2003    (GB) ................................. 0304602.6

(51) Int. Cl.
*C09K 8/28*    (2006.01)
(52) U.S. Cl. ...................................... 507/135; 507/119
(58) Field of Classification Search .................. 507/135; 405/138
See application file for complete search history.

(56) References Cited

U.S. PATENT DOCUMENTS

| 3,215,200 | A | * | 11/1965 | Kirkpatrick et al. | ............ 175/69 |
| 4,013,568 | A | * | 3/1977 | Fischer et al. | ................ 507/107 |
| 4,442,018 | A | * | 4/1984 | Rand | ............................ 516/14 |
| 5,443,305 | A | | 8/1995 | Heierli et al. | |
| 5,513,712 | A | * | 5/1996 | Sydansk | ........................ 175/69 |
| 5,808,052 | A | | 9/1998 | Szablikowski et al. | |
| 5,858,928 | A | | 1/1999 | Aubert et al. | |
| 6,076,997 | A | | 6/2000 | First et al. | |
| 6,287,052 | B1 | | 9/2001 | Basset et al. | |
| 6,485,233 | B1 | | 11/2002 | Ellenberger | |

FOREIGN PATENT DOCUMENTS

| EP | 0 638 137 B1 | 9/1996 |
| FR | 2 690 709 A | 11/1993 |
| WO | WO 99/18330 A | 4/1999 |
| WO | WO 01/12952 A | 2/2001 |

\* cited by examiner

*Primary Examiner*—Timothy J. Kugel
*Assistant Examiner*—Atnaf Admasu
(74) *Attorney, Agent, or Firm*—Curatolo Sidoti Co., LPA; Joseph G. Curatolo; Salvatore A. Sidoti

(57) ABSTRACT

A method of boring a tunnel by means of an earth pressure balance tunnel boring machine, comprising the injection at the cutting head of a foamed aqueous solution and an aqueous solution of a water-soluble acrylic acid-based polymer. The method allows easier tunnel boring in soft, sticky soils.

19 Claims, No Drawings

METHOD AND COMPOSITION FOR INJECTION AT A TUNNEL BORING MACHINE

CROSS REFERENCE TO RELATED APPLICATIONS

This application is a national stage application of International Application No. PCT/EP2004/001229, filed Feb. 10, 2004, which claims the benefit of Application No. GB 0304602.6 filed Feb. 28, 2003, from which applications priority is claimed.

This invention relates to earth pressure balance shield tunnel boring machines and to a composition for use therein.

Tunnel boring machines (TBMs) comprising large diameter cutting heads are well known and widely used. For boring in soft ground, the type usually used is a shield TBM. In this machine, the TBM and its ancillary equipment are housed in a cylindrical body known as a "shield"). Within the shield, behind the cutting head is a working chamber that receives the excavated soil and a conveyor to convey it away. A further variant of the shield TBM is the earth pressure balance TBM (EPBM). In such a machine, the bored face is maintained by the injection of aqueous foam that both helps maintain the bored face and bear away the soil. The pressure at the face is maintained at a level that will maintain the face, but that will not cause the soil at the surface to rise, with consequent damage to buildings on the surface, hence the name "earth pressure balance". The pressure is controlled by the speed of the TBM, the foam injection rate and pressure as well as by the soil extraction rate by means of the conveyor. In addition, the foams assist in preventing the clogging of the cutting discs, a constant problem in soft soils.

It has now been found that substantially improved performance can be obtained in the use of EPBMs by the injection of an additional substance. The invention therefore provides a method of boring a tunnel by means of an earth pressure balance TBM, comprising the injection at the cutting head of a foamed aqueous solution and an aqueous solution of a water-soluble acrylic acid-based polymer.

The foam may be generated by the foaming of an aqueous solution of at least one surfactant. Any surfactant that can be foamed is suitable for use in this invention, but preferred surfactants include sulphate esters, sulphate ethers and sulphonates.

Preferred examples of suitable surfactant include polyalkylene alkyl ether sulphate, where the polyalkylene oxide chain has an average chain length of from 1-3 alkylene oxide units. If the surfactant is a lauryl ether sulphate, it is preferred that the ether portion be composed of no more than two oxyethyl units.

Typical commercial materials include the "Alscope" (trade mark) series of Toho Chemical Industry Co.

Other particularly preferred types include monoisopropanol ammonium lauryl alcohol sulphate (commercially available as, for example, "Sulfetal" (trade mark) Cjot 60, α-olefin sulphonate (CAS Registry Number 68439-57-6), commercially available as, for example, "Rhodocal" (trade mark) A-246-L, and $C_{8-22}$ fatty alcohol sulphate salts and $C_{8-22}$ fatty alcohol ether sulphate salts, the fatty alcohol preferably being lauryl alcohol, the ether being an ether formed with a alkylene oxide (preferably ethylene oxide) chain of from 1-3 alkylene oxide units, and the salt-forming cation being preferably selected from alkali metal, magnesium and alkanolamine.

Water-soluble acrylic acid-based polymers are well-known commercial materials. The materials for use in this invention are of relatively low molecular weight, from 2,000-20,000, preferably from 2,000-10,000 and more preferably from 4,000-6,000. Although a small proportion of monomer other than acrylic acid can be tolerated (no more than 10% by weight, it is preferred that the polymer be 100% acrylic acid. The use of the term "acrylic acid" in this invention includes not only the acid itself but also the salts thereof. A preferred acrylic acid is the salt of a monovalent cation such as sodium, potassium, ammonium or a tertiary or quaternary amine.

The acrylic acid-based polymer solution and the foamable surfactant solution may be used as separate solutions, or they may be combined. The invention therefore also provides a foaming solution for use with earth pressure balance tunnel boring machines, comprising an aqueous solution of an acrylic acid-based polymer and an aqueous solution of an anionic surfactant selected from sulphate esters, sulphate ethers and sulphonates.

The surfactant solution may be foamed and injected through the cutting head. The surfactant is preferably injected at a rate of from 0.2-4, more preferably from 0.5-2, most preferably from 0.5-1.5 Kg dry material per $M^3$ of excavated soil and the acrylic acid-based polymer is injected at a rate of from 0.05-2.0, preferably from 0.1-1.0, more preferably from 0.2-0.5 Kg dry polymer per $M^3$ of excavated soil.

The method of this invention has a number of advantages over the previous methods utilising foams with EPBMs. The acrylic acid-based polymer has been found to act as a plasticiser for the soil in this situation. This has three important consequences. Firstly, it enables a soil consistency best suited to easy extraction to be more readily achieved. Secondly, this achievement of an optimum soil consistency leads to reduced torque at the cutting head or leads to a higher excavation speed at the defined torque. Thirdly, it permits a reduction in the water needed to plastify the soil. This in turn means that the soil can be more readily disposed of. It is preferred to dispose of soil in landfill, but this is not possible if the water content is too high, as is often the case, forcing either the use of auxiliary dewatering procedures or the use of alternative disposal methods, both more expensive and less convenient.

The invention is further described with reference to the following non-limiting example.

EXAMPLE

Samples of a standard soil having a spread (according DIN 18555-2) of 120 mm are mixed with 30% FIR (Foam Injection Rate) of foams having a FER (Foam Expansion Rate) of 10. The quantity of foamed liquid used is 30 g per $dm^3$ of soil.

The foams used are:
a) Foam made from a 3% (wt.) solution of a commercially-available foaming agent (MEYCO® FIX SLF 20);
b) Foam made from a solution containing 3% of MEYCO® FIX SLF 20 and 2% of a 45% solution of a sodium salt of polyacrylic acid, having a weight-average MW of 5000.

|  | Standard Soil | Standard Soil + Foam a) | Standard Soil + Foam b) |
| --- | --- | --- | --- |
| Spread according DIN 18555-2 (mm) | 120 | 170 | 260 |

This clearly shows the plastifying effect of the composition used in the present invention. To achieve without foaming compositions the 260 mm spread achieved by the composition of the invention, 170 g per dm$^3$ of soil of extra water was required. In a tunnelling application, the presence of this water would mean either the need for a dewatering procedure before the soil could be used in landfill, or an alternative means of disposal.

The invention claimed is:

1. A method of boring a tunnel by means of an earth pressure balance tunnel boring machine, comprising the injection at a cutting head of the earth pressure balance tunnel boring machine of a foamed aqueous surfactant solution and an aqueous solution of a water-soluble acrylic acid-based polymer, wherein the foamed aqueous surfactant solution is injected at a rate of from 0.2 to 4 Kg dry material per cubic meter of excavated soil, and wherein the acrylic acid-based polymer is injected at a rate of from 0.05 to 2 Kg dry polymer per cubic meter of excavated soil.

2. The method according to claim 1, in which the foamed aqueous surfactant solution and the aqueous solution of a water-soluble acrylic acid-based polymer are added as a single material.

3. The method according to claim 1, wherein the foamed aqueous surfactant solution is injected at a rate of from 0.5 to 2 Kg dry material per cubic meter of excavated soil.

4. The method according to claim 1, wherein the acrylic acid-based polymer is injected at a rate of from 0.1 to 1 Kg dry polymer per cubic meter of excavated soil.

5. The method according to claim 1, wherein the acrylic acid-based polymer is injected at a rate of from 0.2 to 0.5 Kg dry polymer per cubic meter of excavated soil.

6. The method according to claim 1, wherein the foamed aqueous surfactant solution comprises an anionic surfactant selected from sulphate esters, sulphate ethers and sulphonates.

7. The method according to claim 6, wherein the surfactant comprises a lauryl ether sulphate, whose ether portion consists of two oxyethyl units maximum.

8. The method according to claim 6, wherein the surfactant comprises a polyalkylene alkyl ether sulphate, and wherein the polyalkylene oxide chain of the polyalkylene alkyl ether sulphate has an average chain length of from 1-3 alkylene oxide units.

9. The method according to claim 6, wherein the surfactant comprises at least one of α-olefin sulphonate, $C_{8-22}$ fatty alcohol sulphate salts, $C_{8-22}$ fatty alcohol ether sulphate salts or mixtures thereof.

10. The method according to claim 6, wherein the surfactant comprises monoisopropanol ammonium lauryl alcohol sulphate.

11. The method according to claim 6, wherein the acrylic acid-based polymer is an acrylic acid-based polymer salt comprising a monovalent cation that is at least one of sodium, potassium, ammonium, tertiary amine, quaternary amine or mixtures thereof.

12. A foaming solution for use with earth pressure balance tunnel boring machines, comprising an aqueous solution of an acrylic acid-based polymer and an anionic surfactant, wherein the acrylic acid-based polymer has a molecular weight from 2,000 to 20,000, and wherein the surfactant comprises at least one of $C_{8-22}$ fatty alcohol sulphate salts, $C_{8-22}$ fatty alcohol ether sulphate salts, or mixtures thereof.

13. The foaming solution according to claim 3, wherein the surfactant comprises monoisopropanol ammonium lauryl alcohol sulphate.

14. The foaming solution according to claim 12, wherein the $C_{8-22}$ fatty alcohol ether sulphate salts comprise at least one of:
   a. lauryl alcohol;
   b. an ether formed with an alkylene oxide chain of from 1 to 3 alkylene oxide units; or
   c. a salt forming cation selected from alkali metal, magnesium and alkanolamine.

15. The foaming solution according to claim 3, wherein the acrylic acid-based polymer has a molecular weight from 2,000 to 10,000.

16. The foaming solution according to claim 3, wherein the acrylic acid-based polymer is derived from acrylic acid.

17. The foaming solution according to claim 3, wherein the acrylic acid-based polymer is a salt.

18. The foaming solution according to claim 17, wherein the acrylic acid-based polymer salt comprises a monovalent cation that is at least one of sodium, potassium, ammonium, tertiary amine, quaternary amine or mixtures thereof.

19. A method of boring a tunnel by means of an earth pressure balance tunnel boring machine, comprising the injection at a cutting head of the earth pressure balance tunnel boring machine of a foamed aqueous surfactant solution and an aqueous solution of a water-soluble acrylic acid-based polymer, wherein the foamed aqueous surfactant solution and the aqueous solution of water-soluble acrylic acid-based polymer are added separately.

* * * * *